United States Patent [19]

Adoul

[11] Patent Number: 4,481,659
[45] Date of Patent: Nov. 6, 1984

[54] APPARATUS AND METHOD OF REDUCING THE BIT RATE OF PCM SPEECH

[75] Inventor: Jean-Pierre Adoul, Sherbrooke, Canada

[73] Assignee: Universite de Sherbrooke, Canada

[21] Appl. No.: 348,085

[22] Filed: Feb. 11, 1982

[51] Int. Cl.$^3$ .................. G10L 1/00; H03K 13/22; H04B 1/66
[52] U.S. Cl. .................. 381/31; 340/347 DD; 375/122
[58] Field of Search .................. 381/31, 106; 375/122; 364/513, 513.5; 340/347 DD

[56] References Cited

U.S. PATENT DOCUMENTS

| 3,559,068 | 1/1971 | Almering et al. |
| 3,602,818 | 8/1971 | Carrette. |
| 3,674,939 | 7/1972 | Brooks. |
| 3,707,680 | 12/1972 | Gabbard et al. |
| 3,784,737 | 1/1974 | Waehner ..................... 375/122 |
| 3,945,002 | 3/1976 | Duttweiler et al. ........ 340/347 DD |
| 4,002,841 | 1/1977 | Ching et al. |
| 4,005,274 | 1/1977 | Vagliami et al. |
| 4,314,105 | 2/1982 | Mozer ..................... 375/122 |
| 4,375,013 | 2/1983 | Cointot et al. ................... 375/122 |

Primary Examiner—E. S. Matt Kemeny
Attorney, Agent, or Firm—Cushman, Darby & Cushman

[57] ABSTRACT

Bit rate in a PCM Companding system is reduced by transmitting sample magnitude ($X_n$) if the sample is near a zero-crossing, and transmitting the difference ($D_n$) between sequential samples if not near a zero-crossing. ROMs are used for mapping (transforming) full versus reduced data.

13 Claims, 6 Drawing Figures

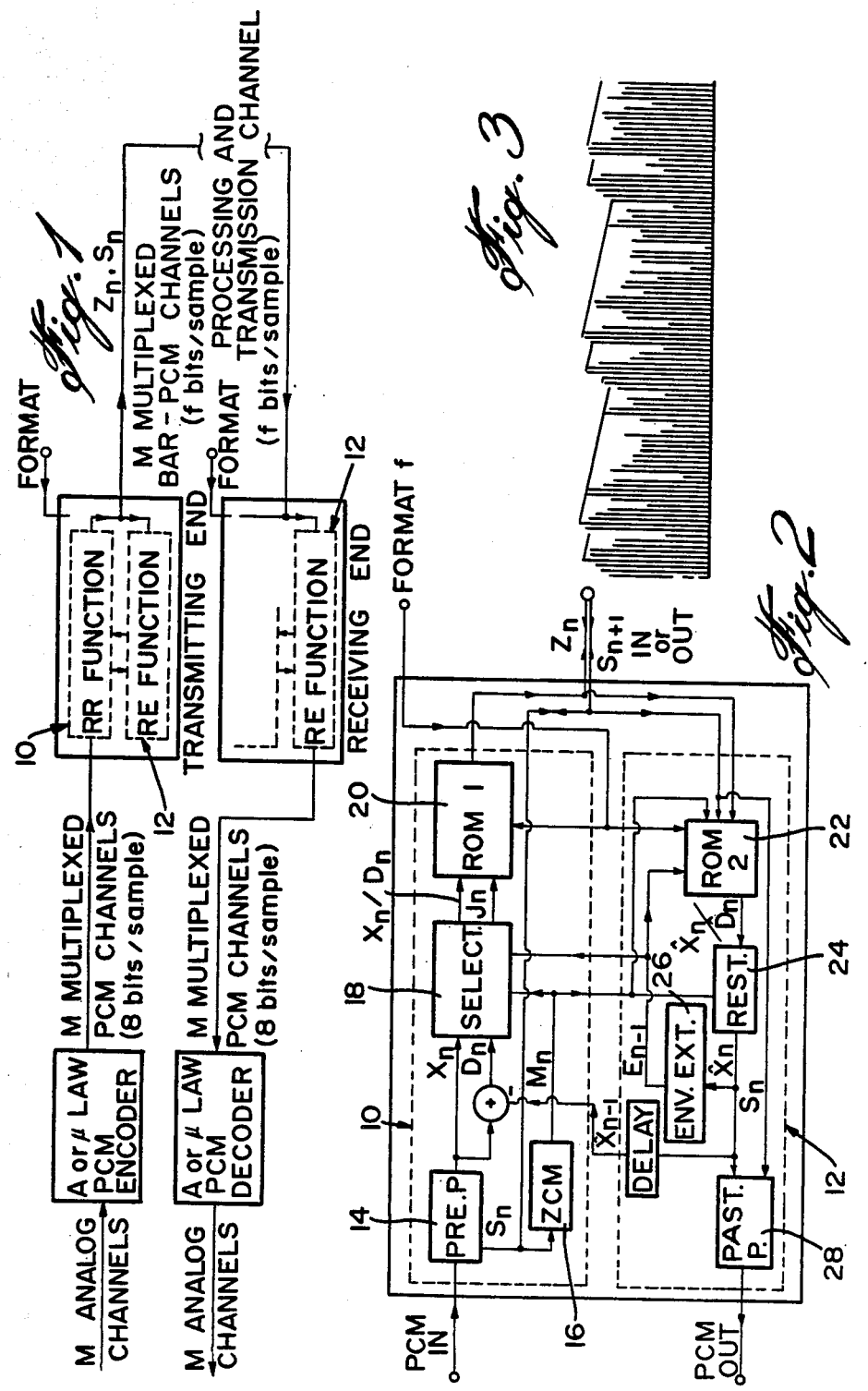

APPARATUS AND METHOD OF REDUCING THE BIT RATE OF PCM SPEECH

FIELD OF THE INVENTION

The present invention relates generally to PCM (Pulse Code Modulation) telecommunications and, more particularly, to a method and apparatus for reducing the bit rate of speech channels already encoded in PCM.

BACKGROUND OF THE INVENTION

PCM is a well-known method of transmitting telephone speech which consists of periodically sampling the amplitude of voice-frequency signal and translating these amplitudes into digital form. This method is well suited to the transmission of several voice channels using time division multiplex.

PCM transmission of telephone speech is extensively used in North America and in the world. Several schemes have been proposed for the purpose of reducing the bit rate of PC speech: in particular, the technique known as NIC (Nearly Instantenous Companding, invented by Deutweiller et Messerschmitt and described in U.S. Pat. No. 3,945,002 issued Mar. 16, 1976) which reduces from 8 bits per sample to 6 bits per sample with the provision that three overhead bits be sent every N samples (where N is some fixed integer between 6 and 128).

OBJECTS OF THE INVENTION

An object of the invention is to reduce the rate of the PCM speech representation from an 8 to an f bit/sample while preserving a high subjective quality, in particular, a better quality than that which would be obtained by simply dropping the 8-f least significant bits of the PCM representation.

It is a further object of the present invention to provide a reduced format which can be prescribed dynamically, that is, a different format can be prescribed from sample to sample in a given voice channel. In addition in a time-division-multiplex embodiment a different format can be prescribed from channel to channel.

It is still a further object of the present invention to reduce the bit rate of PCM speech in a multiplexed voice-channel system to a digital speech using 6, 5, 4 or 3 bits per sample format.

For each of the time-division-multiplexed channels, say channel m (where m=1, 2, 3 ... M), the input PCM sample is denoted at time n by $X_n$ and $S_n$ which are respectively the sample magnitude (i.e.: absolute value: $X_n = 0, 1, 2, \ldots, 127$) and its sign ($S_n = 0, 1$ where 0 stands for a negative sample and 1 for a positive one).

After the rate reduction operation, the sample is transmitted under a new representation namely: $Z_n$ and $S_n$ which are respectively the "tag" (some number $Z_n = 0, 1, 2, \ldots, 2^{f-1} - 1$) and the sign.

Finally at the receiving end, a PCM word is retrieved denoted $\hat{X}_n$ and $S_n$ which are respectively the (output) sample magnitude and its sign.

While the technique does not interfere with the transmission of the sign $S_n$, the retrieved magnitude $\hat{X}_n$ might be slightly different from the input magnitude $X_n$ but without resulting in subjective degradation.

The above objects and others are achieved with the present invention where in a pulse code modulation (PCM) transmission system for communicating digitized message samples between a transmitting station and a receiving station, the transmitting station includes an apparatus for reducing the bit rate of PCM samples from an 8-bit per sample format to an f-bit per sample format; the apparatus comprises (a) input means for receiving and breaking down each input PCM sample received to a magnitude $X_n$, wherein $X_n$ is the absolute value of the sample at time n, and to a sign $S_n$, wherein $S_n$ is the sign of the sample at time n;

(b) feedback means for transmitting a retrievable sample $\hat{X}_{n-1}$, wherein $\hat{X}_n$ is the magnitude of a retrieved sample at time n;

(c) means for extracting an envelope information from $\hat{X}_n$;

(d) means for extracting information relating to a sign change between consecutive samples to provide a zero-crossing mode $M_n$;

(e) means for computing the difference $D_n$ at time n between $X_n$ and $\hat{X}_{n-1}$;

(f) selecting means for transmitting
$X_n$ when $X_n$ is in the vicinity of a sign change or for transmitting $D_n$ otherwise; and
a quantizer value reflecting a zero-crossing mode $M_n$ and a signal energy indicated by said envelope extracting means;

(g) first mapping means for establishing a correspondence between $X_n$ or $D_n$ transmitted and a binary word having f−1 number of bits;

(h) second mapping means for providing said retrieved sample $\hat{X}_n$ or a retrieved difference $\hat{D}$ from information obtained from the binary word, the format, the zero-crossing mode $M_n$ and the envelope extracting means; and (i) means combining $S_n$ and $\hat{X}_n$ to provide an output PCM sample.

The present invention also relates to a method for reducing the bit rate of digitized message PCM samples.

BRIEF DESCRIPTION OF THE DRAWINGS

The invention will be more thoroughly understood after reading the following detailed description in conjunction with the drawings wherein:

FIG. 1 is a simplified block diagram of the system according to the present invention;

FIG. 2 is a block diagram of the device according to the present invention;

FIG. 3 is a graph giving an envelope estimate;

DETAILED DESCRIPTION OF THE INVENTION

Figure 4:
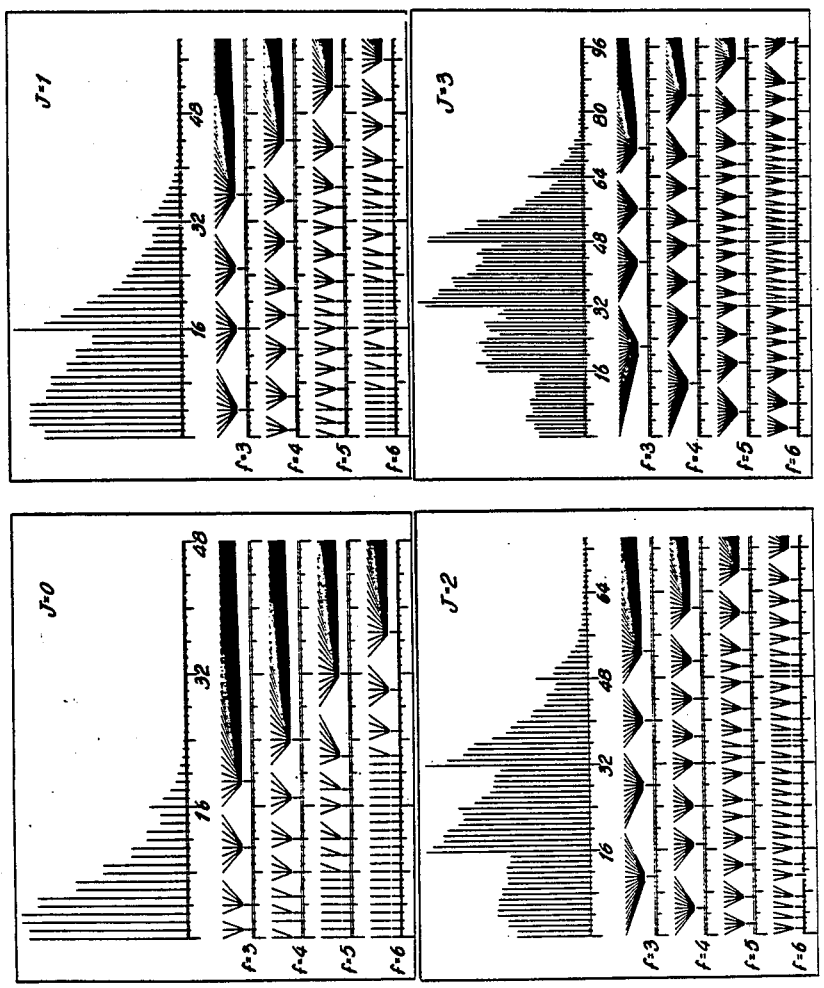
FIGS. 4, 5 and 6 give probability distributions of PCM magnitudes and reencoder mappings for the cases $J = 0, 1, 2, \ldots, 11$.

In PCM, the speech is band-pass filtered between 300 and 3400 Hz and sampled at 8000 samples per second. Each sample is then rounded off by a nonuniform quantizer and coded in binary by an 8-bit word.

Considering the sample at time n, the most significant bit is the sign bit, denoted $S_n$. The other seven bits represent the magnitude and is denoted $X_n$. In decimal, this magnitude can be expressed as an integer between 0 and 127.

$S_n = 0$ (negative), 1 (positive)

$X_n = 0, 1, 2, \ldots, 127$

In the 255 companding law the magnitude $X_n$ is essentially the log of the actual voltage of the sample. This arrangement provides a wide dynamic range for the speech signal and a signal to noise ratio which is basically constant.

The present invention relates to a method of reducing the bit rate of PCM speech in a multiplexed voice-channel system.

FIG. 1 illustrates the overall use of the device which is composed of two parts: the RR module 10 (Rate Reduction) and the RE module 12 (Rate Expansion). While the Rate Expansion function which takes place at the receiving end requires only the RE module, the Rate Reduction at the transmitting end requires that both the RR and RE modules be operative as illustrated on FIG. 2. In this case, the RE module is used to replicate locally the expansion process which takes place at the receiving end, thereby providing a feedback to the RR module. This feedback consists of two quantities: First, $\hat{X}_{n-1}$ which is a replicate of the retrieved magnitude at time n−1 and, second, $E_{n-1}$ which is an estimate of the signal's envelope also at time n−1.

The RR module 10 includes a preprocessing module 14 in which the input PCM sample at time n is broken down into its magnitude, $X_n$, and its sign, $S_n$. The order of the binary bits of $X_n$ are further reversed, (least significant bit leading) for subsequent serial arithmetic processing. Finally the magnitude is delayed during one sampling time to allow the sign $S_{n+1}$ of the forthcoming sample to reach the ZCM (zero-crossing-mode) module 16.

This module 16 outputs a flag $M_n$ ($M_n=0,1$). $M_n=1$ signals the fact that $X_n$ is in the vicinity of a zero crossing of the speech waveform (i.e.: a sign change between two consecutive samples). More precisely: $M_n=0$ whenever $S_{n-2}=S_{n-1}=S_n=S_{n+1}$ otherwise $M_n=1$.

Prior to entering the processing module 18, the difference $D_n = X_n - \hat{X}_{n-1}$ is computed. One characteristic feature of the procedure is that $X_n$ will be processed and transmitted whenever $X_n$ is in the vicinity of a zero crossing ($M_n=1$). This is the direct scheme. On the other hand, when $X_n$ is far from any zero crossing (i.e.: usually at waveform maxima, $M_n=0$), it is the quantity $D_n$ which is transmitted following adequate processing. This is the differential scheme. This feature of the procedure takes advantage of properties of the PCM logarithmic companding law.

The processing module 18 selects therefore either $X_n$ or $D_n$ on the basis of $M_n$. The object of this module is to provide two outputs: first, a properly scaled and bounded $X_n$ or $D_n$ (depending on which has been selected) and second an index, ($j=0,1,2,\ldots,J-1$), which reflects both the zero crossing mode $M_n$ and the signal energy as indicated by the envelope information $E_{n-1}$. Basically, for a given $M_n$ a large value of J indicates a large input signal and a small value a small signal. Typically $J=0,\ldots,7$ when $M_n=1$ and $J=8,9,\ldots,11$ when $M_n=0$.

The purpose of the mapping module 20 is to provide a correspondence between a given magnitude $X_n$ (or difference $D_n$) and a tag $Z_n$ with a prescribed number of bits. This number of bits is $f=1$ where f is the format specified by the user at time n. The mapping module is typically implemented using a Read-Only-Memory (ROM). For each format f, there are J different possible mappings between $X_n$ (or $D_n$) and the tags. A preferred embodiment consists of using $X_n$ (or $D_n$) with j as the address field of the ROM. In this case, the ROM is composed of J partitions each containing one of the J possible correspondences or mappings between $X_n$ (or $D_n$) and the tags $Z_n$.

The low bit rate output of the device is a f bit word made of $S_{n+1}$ and the tag $Z_n$ with f-1 bits. The low bit rate word which proceeds either from a distant transmitter or from the local RR function is interpreted by the reverse mapping module 22. This module is also well suited for a Read-Only-Memory type of implementation. The address field of this second memory hereafter referred to as ROM2 is made up of $Z_n$, of the format f, the zero-crossing mode $M_n$, and the envelope estimate $E_{n-1}$. The content of the memory corresponding to a particular address provides directly the retrieved magnitude $\hat{X}_n$, if $M_n=1$, or the retrieved difference $\hat{D}_n$ if $M_n=0$.

The restoration module 24 retrieves $\hat{X}_n$ from the previous magnitudes $\hat{X}_{n-1}$ and the transmitted difference $\hat{D}_n$ whenever the transmission is in the differential mode.

$$X_n = X_{n-1} + D_n$$

The envelope extraction module 26 receives the retrieved magnitude $X_n$ and extracts an envelope information according to the following recursive procedure:

$$E_n = \max[E_{n-1}-1, X_n]$$

The past processing module 28 combines $S_n$ and $\hat{X}_n$ to obtain the output PCM sample. In particular the order of the bits of the magnitude are reversed (most significant bit leading) and properly complemented to yield the standard PCM representation.

Other recursive forms may be selected for this estimate such as low order filtering of $\hat{X}_{n-1}$. This form is selected, however, for both its simplicity of implementation and its ability to swiftly increase upon voicing attacks. Advantageously, this estimate does not have any time constant in terms of increase. By contrast, the rate of decrease is slowed down.

FIG. 3 exemplifies this behavior on an actual sequence of PCM magnitudes. Three pitch periods are represented. It can be seen that, with this particular time constant, the estimate is able to maintain reasonably well the pick value over the pitch interval. Some of the implementation simplicity of this estimate would be lost if a slower time constant was sought for.

Let us now turn to the question of using this envelope information to control the quantization stage. The approach is that of using a set of quantizers and to switch on one or the other according to the value of the envelope. It would be both prohibitive and useless to use 128 quantizers, one for each value of the envelope $E_n$. A set of 8 quantizers is retained and labelled from 0 to 7. The rule for selecting the proper quantizer is the following. Quantizer k is to be used whenever the three most significant bits of $E_n$ corresponds to k in decimal, or equivalently, when the integer part of $E_n/16$ is equal to k. This arrangement has the merit to relate the quantizer index to the chord numbers of the PCM companding law. Hence, it may be said that quantizer k will be used whenever the sample-magnitude, $X_n$, to be quantized is most likely to occur in the kth (or a possibly lower) chord.

Figure 5:
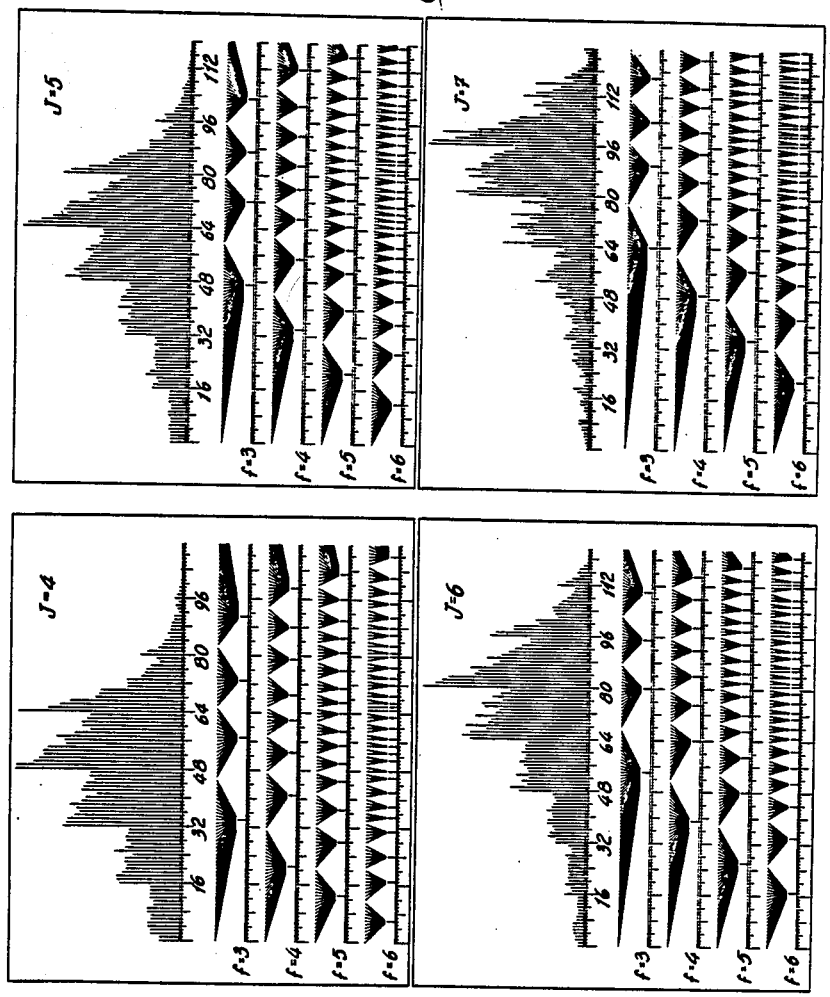
Figure 6:
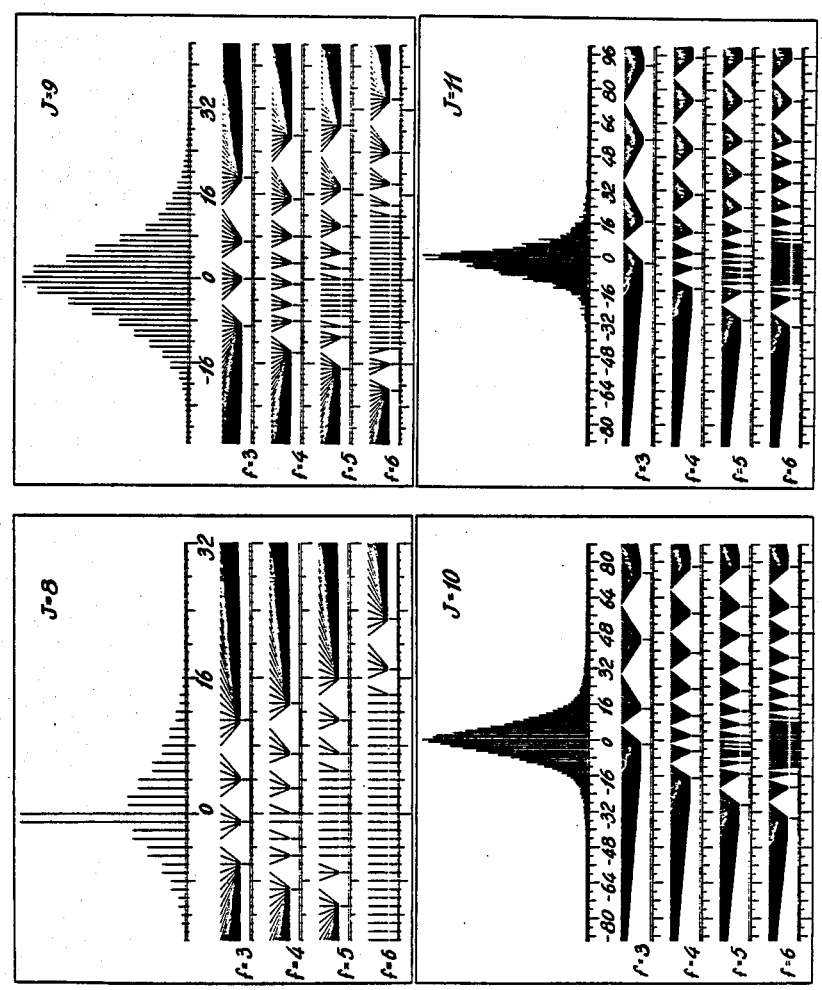

Graphical representation of the reencoders are given in FIGS. 4, 5, 6 with the probability distributions for magnitudes and increments conditioned upon the various values of k.

TABLE 1

X = 0,127  TABLE FOR J = 1

| FORMAT f = | 3 | 4 | 5 | 6 |
|---|---|---|---|---|
| $X_n$ = 0 | $Z_n$ = 0 | 0* | 0* | 0* |
| 1 | 0* | 0 | 1* | 1* |
| 2 | 0 | 1* | 2* | 2* |
| 3 | 1 | 2* | 3* | 3* |
| 4 | 1* | 2 | 4* | 4* |
| 5 | 1 | 3* | 5* | 5* |
| 6 | 1 | 3 | 6* | 6* |
| 7 | 1 | 4 | 7* | 7* |
| 8 | 2 | 4* | 8* | 8* |
| 9 | 2 | 4 | 8 | 9* |
| 10 | 2 | 4 | 9* | 10* |
| 11 | 2* | 5 | 9 | 11* |
| 12 | 2 | 5* | 10* | 12* |
| 13 | 2 | 5 | 10 | 13* |
| 14 | 2 | 5 | 10 | 14* |
| 15 | 2 | 6 | 11 | 15* |
| 16 | 3 | 6 | 11* | 16* |
| 126 | 3 | 8 | 16 | 63 |
| 127 | 3 | 8 | 15 | 63 |

This table illustrates the way the content of ROM1 and ROM2 is extracted from the graphs of FIGS. 4, 5, 6. The above example relates to the first case, J=0, namely the transcoding of $X_n$ into $Z_n$ by ROM1 and the reverse transcoding of $Z_n$ back into $\hat{X}_n$ by ROM2. Suppose for instance $X_n$=7 (and J=0) that ROM1 will provide the outputs $Z_n$=1,4,7,7, corresponding respectively to formats 3,4,5,6. If the format was, say f=4, the ROM2 would receive $Z_n$=4 (and f=4; J=0) it would provide the output $\hat{X}_n$=8, that is, the value of X in the table corresponding to the value $Z_n$=4 that is noted by an asterisk. For convenience, the values $\hat{X}_n$ (or $\hat{D}_n$) corresponding to a $Z_n$ with an asterisk (i.e.: the prototypes) have been listed in their natural order in Tables 2, 3 and 4 for every State J=1,2, ..., 15 and every format f=3,4,5 and 6. Note that for format f there are $2^{f-1}$ such prototypes.

TABLE 2 f: Prototypes for j = 0 ($X_n$, k = 0)  P(0) = .084

| 3 | 1 | 4 | 11 | 19 | | | | |
|---|---|---|---|---|---|---|---|---|
| 4 | 0 | 2 | 3 | 5 | 8 | 12 | 17 | 24 |
| 5 | 0 | 1 | 2 | 3 | 4 | 5 | 6 | 7 |
|   | 8 | 10 | 12 | 14 | 16 | 18 | 22 | 32 |
| 6 | 0 | 1 | 2 | 3 | 4 | 5 | 6 | 7 |
|   | 8 | 9 | 10 | 11 | 12 | 13 | 14 | 15 |
|   | 16 | 17 | 18 | 19 | 20 | 21 | 22 | 23 |
|   | 24 | 25 | 26 | 27 | 28 | 30 | 33 | 37 | f: Prototypes for j = 1 ($X_n$, k = 1)  P(1) = .092

| 3 | 4 | 16 | 25 | 36 | | | | |
|---|---|---|---|---|---|---|---|---|
| 4 | 1 | 6 | 13 | 18 | 22 | 29 | 35 | 44 |
| 5 | 0 | 2 | 4 | 7 | 10 | 13 | 16 | 18 |
|   | 20 | 23 | 27 | 31 | 34 | 37 | 43 | 52 |
| 6 | 0 | 1 | 2 | 3 | 4 | 5 | 6 | 7 |
|   | 9 | 10 | 12 | 13 | 16 | 17 | 18 | 19 |
|   | 20 | 21 | 22 | 23 | 25 | 27 | 30 | 32 |
|   | 33 | 34 | 36 | 38 | 41 | 46 | 50 | 56 | f: Prototypes for j = 2 ($X_n$, k = 2)  P(2) = .074

| 3 | 11 | 28 | 40 | 53 | | | | |
|---|---|---|---|---|---|---|---|---|
| 4 | 5 | 17 | 24 | 32 | 37 | 44 | 51 | 61 |
| 5 | 2 | 7 | 13 | 18 | 22 | 25 | 30 | 33 |
|   | 35 | 38 | 42 | 47 | 50 | 53 | 60 | 68 |
| 6 | 1 | 3 | 5 | 7 | 11 | 13 | 16 | 18 |
|   | 20 | 22 | 24 | 26 | 28 | 30 | 32 | 33 |
|   | 35 | 36 | 37 | 38 | 40 | 43 | 46 | 48 |
|   | 49 | 50 | 52 | 55 | 58 | 62 | 66 | 72 | f: Prototypes for j = 3 ($X_n$, k = 3)  P(3) = .062

| 3 | 22 | 43 | 56 | 71 | | | | |
|---|---|---|---|---|---|---|---|---|
| 4 | 13 | 29 | 38 | 47 | 53 | 61 | 69 | 84 |
| 5 | 6 | 18 | 25 | 32 | 35 | 40 | 45 | 48 |

TABLE 2-continued

| | 51 | 54 | 59 | 64 | 67 | 72 | 80 | 93 |
|---|---|---|---|---|---|---|---|---|
| 6 | 2 | 8 | 16 | 19 | 23 | 26 | 31 | 33 |
|   | 34 | 36 | 38 | 41 | 43 | 45 | 48 | 49 |
|   | 50 | 51 | 53 | 55 | 57 | 60 | 63 | 65 |
|   | 66 | 68 | 71 | 73 | 78 | 83 | 87 | 97 |

TABLE 3 f: Prototypes for j = 4 ($X_n$, k = 4)  P(4) = .060

| 3 | 34 | 57 | 73 | 95 | | | | |
|---|---|---|---|---|---|---|---|---|
| 4 | 21 | 41 | 53 | 62 | 69 | 79 | 88 | 99 |
| 5 | 13 | 28 | 37 | 45 | 50 | 55 | 59 | 64 |
|   | 67 | 71 | 76 | 81 | 85 | 90 | 96 | 103 |
| 6 | 6 | 17 | 24 | 31 | 35 | 38 | 42 | 46 |
|   | 48 | 51 | 53 | 55 | 57 | 60 | 63 | 65 |
|   | 66 | 67 | 69 | 72 | 74 | 77 | 80 | 81 |
|   | 83 | 86 | 88 | 91 | 95 | 98 | 102 | 108 | f: Prototypes for j = 5 ($X_n$, k = 5)  P(5) = .071

| 3 | 47 | 72 | 87 | 103 | | | | |
|---|---|---|---|---|---|---|---|---|
| 4 | 34 | 55 | 67 | 76 | 83 | 92 | 101 | 112 |
| 5 | 21 | 40 | 51 | 58 | 65 | 69 | 73 | 78 |
|   | 82 | 85 | 89 | 94 | 99 | 104 | 110 | 116 |
| 6 | 12 | 27 | 36 | 43 | 49 | 52 | 56 | 59 |
|   | 63 | 65 | 67 | 69 | 71 | 74 | 76 | 79 |
|   | 81 | 82 | 84 | 85 | 87 | 90 | 93 | 95 |
|   | 98 | 100 | 102 | 105 | 108 | 112 | 115 | 119 | f: Prototypes for j = 6 ($X_n$, k = 6)  P(6) = .048

| 3 | 54 | 80 | 95 | 110 | | | | |
|---|---|---|---|---|---|---|---|---|
| 4 | 39 | 64 | 75 | 84 | 92 | 99 | 108 | 115 |
| 5 | 26 | 48 | 59 | 67 | 72 | 78 | 82 | 85 |
|   | 89 | 94 | 98 | 101 | 105 | 110 | 114 | 118 |
| 6 | 17 | 34 | 44 | 51 | 56 | 61 | 65 | 68 |
|   | 71 | 73 | 76 | 79 | 81 | 82 | 84 | 86 |
|   | 87 | 90 | 92 | 95 | 97 | 98 | 100 | 101 |
|   | 104 | 106 | 108 | 112 | 113 | 114 | 117 | 121 | f: Prototypes for j = 7 ($X_n$, k = 7)  P(7) = .008

| 3 | 64 | 94 | 104 | 118 | | | | |
|---|---|---|---|---|---|---|---|---|
| 4 | 49 | 73 | 85 | 94 | 101 | 109 | 115 | 124 |
| 5 | 35 | 57 | 68 | 77 | 82 | 87 | 91 | 96 |
|   | 99 | 102 | 106 | 111 | 114 | 117 | 121 | 126 |
| 6 | 22 | 42 | 53 | 60 | 65 | 70 | 74 | 78 |
|   | 81 | 83 | 86 | 88 | 89 | 92 | 95 | 97 |
|   | 98 | 100 | 101 | 103 | 104 | 107 | 110 | 112 |
|   | 113 | 114 | 116 | 118 | 119 | 122 | 124 | 127 |

TABLE 4 f: Prototypes for j = 8 ($D_n$, k = 0)  P(8) = .071

| 3 | −6 | −1 | 4 | 11 | | | | |
|---|---|---|---|---|---|---|---|---|
| 4 | −9 | −5 | −3 | −1 | 0 | 3 | 7 | 13 |
| 5 | −11 | −7 | −5 | −4 | −3 | −2 | −1 | 0 |
|   | 1 | 2 | 3 | 4 | 5 | 7 | 11 | 16 |
| 6 | −15 | −14 | −13 | −12 | −11 | −10 | −9 | −8 |
|   | −7 | −6 | −5 | −4 | −3 | −2 | −1 | 0 |
|   | 1 | 2 | 3 | 4 | 5 | 6 | 7 | 8 |
|   | 9 | 10 | 11 | 12 | 13 | 14 | 17 | 23 | f: Prototypes for j = 9 ($D_n$, k = 1)  P(9) = .068

| 3 | −9 | 0 | 7 | 19 | | | | |
|---|---|---|---|---|---|---|---|---|
| 4 | −14 | −8 | −5 | −1 | 3 | 8 | 15 | 27 |
| 5 | −17 | −11 | −9 | −7 | −6 | −5 | −4 | −3 |
|   | −2 | −1 | 0 | 2 | 5 | 10 | 17 | 29 |
| 6 | −21 | −16 | −13 | −12 | −11 | −10 | −9 | −8 |
|   | −7 | −6 | −5 | −4 | −3 | −2 | −1 | 0 |
|   | 1 | 2 | 3 | 4 | 5 | 6 | 7 | 8 |
|   | 9 | 10 | 11 | 12 | 14 | 18 | 24 | 34 | f: Prototypes for j = 10 ($D_n$, k = 2,3,4,5,6)  P(10) = .344

| 3 | −2 | 14 | 49 | 79 | | | | |
|---|---|---|---|---|---|---|---|---|
| 4 | −17 | −5 | 2 | 11 | 23 | 39 | 57 | 78 |
| 5 | −29 | −15 | −10 | −7 | −6 | −5 | −3 | −1 |
|   | 2 | 7 | 13 | 22 | 34 | 47 | 60 | 78 |
| 6 | −35 | −21 | −15 | −12 | −11 | −10 | −9 | −8 |
|   | −7 | −6 | −5 | −4 | −3 | −2 | −1 | 0 |
|   | 1 | 2 | 3 | 4 | 5 | 6 | 7 | 8 |
|   | 10 | 14 | 20 | 28 | 37 | 48 | 60 | 78 |

TABLE 4-continued

| f: Prototypes for j = 11 (Dn, k = 7) | | | | | | P(11) = .014 | |
|---|---|---|---|---|---|---|---|
| 3 | −4 | 17 | 56 | 95 | | | |
| 4 | −15 | −5 | 2 | 12 | 30 | 52 | 75 | 95 |
| 5 | −30 | −16 | −12 | −9 | −8 | −6 | −5 | −2 |
|   | 1 | 6 | 13 | 24 | 40 | 56 | 75 | 95 |
| 6 | −33 | −19 | −15 | −12 | −11 | −10 | −9 | −8 |
|   | −7 | −6 | −5 | −4 | −3 | −2 | −1 | 0 |
|   | 1 | 2 | 3 | 4 | 5 | 6 | 7 | 9 |
|   | 12 | 17 | 25 | 36 | 46 | 56 | 75 | 95 |

The embodiments of the invention in which an exclusive property or privilege is claimed are defined as follows:

1. In a pulse code modulation (PCM) transmission system for communicating digitized message samples between a transmitting station and a receiving station, said transmitting station including an apparatus for reducing the bit rate of PCM samples from a 8-bit per sample format to a f-bit per sample format, said apparatus comprising:
   (a) input means for receiving and breaking down each input PCM sample received to a magnitude $X_n$, wherein $X_n$ is the absolute value of the sample at time n, and to a sign $S_n$, wherein $S_n$ is the sign of the sample at time n;
   (b) feedback means for transmitting a retrievable sample $\hat{X}_{n-1}$, wherein $\hat{X}_n$ is the magnitude of a retrieved sample at time n;
   (c) means for extracting an envelope information from $\hat{X}_n$;
   (d) means for extracting information relating to a sign change between consecutive samples to provide a zero-crossing signal $M_n$;
   (e) means for computing the difference $D_n$ at time n between $X_n$ and $\hat{X}_{n-1}$;
   (f) selecting means for transmitting
      $X_n$ when $X_n$ is in the vicinity of a sign change or for transmitting $D_n$ otherwise; and
      a quantizer value reflecting a zero-crossing mode $M_n$ and a signal energy indicated by said envelope extracting means;
   (g) first mapping means for establishing a correspondence between $X_n$ or $D_n$ transmitted and a binary word having f−1 number of bits;
   (h) second mapping means for providing said retrieved sample $\hat{X}_n$ or a retrieved difference D from information obtained from said binary word, said format, said zero-crossing signal $M_n$ and said envelope extracting means; and
   (i) means combining $S_n$ and $\hat{X}_n$ to provide an output PCM sample.

2. In a PCM system as defined in claim 1 further comprising restoration means connected to said second mapping means for retrieving $\hat{X}_n$ by adding $D_n$ to the retrieved magnitude $\hat{X}_{n-1}$.

3. In a PCM system as defined in claim 1, wherein said first mapping means comprises a Read-Only-Memory.

4. In a PCM system as defined in claim 1, wherein said second mapping means comprises a Read-Only-Memory.

5. In a PCM system as defined in claim 1, said receiving station including a rate expansion apparatus consisting of means defined under (c), (h) and (i).

6. In a PCM system as defined in claim 5, said rate expansion apparatus further including restoration means connected to said second mapping means for retrieving $\hat{X}_n$ by adding $D_n$ to the last retrieved magnitude $\hat{X}_{n-1}$.

7. In a PCM system as defined in claim 5, wherein said second mapping means of said rate expansion apparatus comprises a Read-Only-Memory.

8. A method for reducing the bit rate of digitized message PCM samples between a transmitting station and a receiving station of a time-division-multiplexed voice-channel system for a 8-bit per sample format to a f-bit per sample format comprising the steps of:
   (a) receiving and breaking each input PCM sample to a magnitude $X_n$ and a sign $S_n$, wherein $X_n$ is the absolute value of the sample at time n and $S_n$ is the sign of the sample at time n;
   (b) transmitting a retrievable sample $\hat{X}_{n-1}$, wherein $\hat{X}_n$ is the magnitude of a retrieved sample at time n;
   (c) extracting an envelope information from $\hat{X}_n$;
   (d) extracting information relating to a sign change between consecutive samples to provide a zero-crossing signal $M_n$;
   (e) computing the difference $D_n$ at time n between $X_n$ and $\hat{X}_{n-1}$;
   (f) transmitting
      $X_n$ when $X_n$ is in the vicinity of a sign change or for transmitting $D_n$ otherwise; and
      a quantizer value reflecting a zero-crossing mode $M_n$ and a signal energy indicated by the envelope extracting step;
   (g) establishing a correspondence between $X_n$ or $D_n$ transmitted and a binary word having f−1 number of bits;
   (h) providing said retrieved sample $\hat{X}_n$ or difference D from information obtained from the binary word, the format, the zero-crossing mode $M_n$ and the envelope; and
   (i) combining $S_n$ and $\hat{X}_n$ to provide an output PCM sample.

9. In a PCM system as claimed in claim 1, wherein said selecting means receives said signal $M_n$ from said means for extracting and transmits one of said $X_n$ and $D_n$ in response to the level of said signal $M_n$.

10. In a PCM system as claimed in claim 9, wherein said signal $M_n$ is at a high level when said $X_n$ is smaller than a predetermined amount and said signal $M_n$ is at a low level when said $X_n$ is larger than said predetermined amount.

11. In a PCM system as claimed in claim 10, wherein the level of said signal $M_n$ is determined to be low whenever said sign of the sample meets the following relationship, $S_{n-2}=S_{n-1}=S_n=S_{n+1}$, wherein $S_{n-2}$ is the sign of the sample at time n−2, $S_{n-1}$ is the sign of the sample at time n−1, and $S_{n+1}$ is the sign of the sample at time n+1.

12. In a PCM system as claimed in claim 1, wherein said first mapping means establishes said correspondence between $X_n$ or $D_n$ transmitted and said binary word having f−1 number of bits in response to said envelope information from $\hat{X}_n$.

13. In a PCM system as claimed in claim 12, wherein said selecting means receives said envelope information from said means for extracting information and outputs an index signal to said first mapping means, said index signal being generated in accordance with said signal $M_n$ and said envelope information.

* * * * *